United States Patent
Kim

(10) Patent No.: US 8,155,840 B2
(45) Date of Patent: Apr. 10, 2012

(54) STEERING ANGLE SENSOR AND VEHICLE SYSTEM HAVING THE STEERING ANGLE SENSOR

(75) Inventor: Chae-soo Kim, Gunpo (KR)

(73) Assignee: Mando Corporation, Pyeongtaek-Si (KR)

( * ) Notice: Subject to any disclaimer, the term of this patent is extended or adjusted under 35 U.S.C. 154(b) by 437 days.

(21) Appl. No.: 12/506,490

(22) Filed: Jul. 21, 2009

(65) Prior Publication Data

US 2010/0023212 A1 Jan. 28, 2010

(30) Foreign Application Priority Data

Jul. 23, 2008 (KR) .................... 10-2008-0071556

(51) Int. Cl.
*G06F 7/00* (2006.01)
(52) U.S. Cl. ............. 701/42; 702/151; 340/465; 701/36
(58) Field of Classification Search .................... 701/36, 701/37, 41, 42; 702/151, 189; 340/465; 180/443
See application file for complete search history.

(56) References Cited

U.S. PATENT DOCUMENTS

| | | | |
|---|---|---|---|
| 6,324,452 B1 * | 11/2001 | Ikegaya | 701/41 |
| 6,584,428 B1 * | 6/2003 | Irle et al. | 702/151 |
| 6,838,846 B2 * | 1/2005 | Matsuoka | 318/432 |
| 7,236,907 B2 * | 6/2007 | Kaster et al. | 702/151 |
| 2003/0102181 A1 * | 6/2003 | Tokumoto | 180/446 |

* cited by examiner

*Primary Examiner* — Paul N Dickson
*Assistant Examiner* — Timothy Wilhelm
(74) *Attorney, Agent, or Firm* — McDermott Will & Emery LLP

(57) ABSTRACT

A steering angle sensor and a vehicle system having the sensor are disclosed. The steering angle sensor for mounting on a vehicle comprises a main gear coupled to and rotated with a steering column; a first auxiliary gear and a second auxiliary gear meshed with the main gear, respectively; angular detection means mounted adjacent to the first and the second auxiliary gears respectively for generating electric signals in concert with rotations of the first and the second auxiliary gears; and a calculation/control module for calculating steering angles from the electric signals generated by the angular detection means, determining a duty ratio corresponding to the steering angle and generating a rough gain pulse width modulation signal and a fine gain pulse width modulation signal.

6 Claims, 6 Drawing Sheets

STEERING ANGLE SENSOR AND VEHICLE SYSTEM HAVING THE STEERING ANGLE SENSOR

TECHNICAL FIELD

The present disclosure relates to a steering angle sensor and a vehicle system having the steering angle sensor. More particularly, the present disclosure relates to a steering angle sensor that transmits steering angle data via pulse width modulation (PMW) signals and a vehicle system having the steering angle sensor.

BACKGROUND OF THE DISCLOSURE

In step with the development of automobile technologies came the installment of systems for providing convenient driving and riding experiences. Such systems include an electric power steering (hereinafter referred to as EPS) for giving the driver a steering assist, an electronic stability program (or ESP) for preventing lane deviation of a vehicle by comparison/evaluation of the driver's steering intention and controlling the vehicle dynamics, and an electronically controlled suspension (or ECS) for varying the vehicle height depending on the road condition and driving needs to enhance the dynamic stability riding comfort.

FIG. 1 is a block diagram schematically showing a vehicle system equipped with an EPS, an ESP and an ECS. A torque sensor 102 senses the torque caused by the driver's operations of the steering wheel and delivers the same to an electronic control unit (or ECU) of the EPS (hereinafter called EPS ECU at 106), which delivers an assisting current corresponding to the received torque to a motor to provide the steering assist.

A steering angle sensor 104 detects the angle of the driver's operated steering wheel and deliver via a CAN (control area network) to the ECU of the ESP (hereinafter called ESP ECU at 108) and to an ECS ECU 110 where the received steering angle is used to perform the respective stability and suspension controls.

FIG. 2 illustrates the construction of a conventional steering angle sensor. As illustrated, the sensor has a main gear 202 to which a first auxiliary gear 204 and a second auxiliary gear 206 are meshed which have adjacently mounted magneto resistance sensors 208 and 210, respectively. Thus, when the steering wheel is turned, main gear 202 and auxiliary gears 204, 206 are rotated in accord. The rotations of auxiliary gears 204, 206 cause magneto resistance sensors 208 and 210 to interact with magnetic members provided inside of auxiliary gears 204, 206 to produce electrical signals in sine wave repeatedly.

A calculation/control module 212 calculates the steering angle using electric signals from magneto resistance sensors 208 and 210 and transmits the same to other systems via a CAN (Controller Area Network) transceiver 214. However, since the conventional steering sensor involved the CAN communication in transmitting the calculated steering angles, the dedicated system of CAN transceiver 214 for such CAN communications is necessary which increases the manufacturing cost.

Especially, in the state of the art where conventional torque sensor and steering angle sensor are being developed into integrated modules as torque-steering angle sensors, such an arrangement of the separate CAN communication modules for transmitting the steering angle data to systems encounters the problem of inefficiency.

DISCLOSURE OF THE INVENTION

In order to solve the above problem, the present disclosure provides a steering sensor that transmits steering data in a PWM (Pulse Width Modulation) signal instead of the CAN communication and a vehicle system equipped with the same steering sensor.

One embodiment of the present disclosure provides a vehicle system comprising a torque-steering angle sensor structured in one sensor unit or two individual sensor pairs for detecting torques and steering angles by a driver's steering operation, determining a duty ratio corresponding to the steering angle and generating a rough gain pulse width modulation signal and a fine gain pulse width modulation signal; and an electronic control unit of an electric power steering system for receiving the rough gain pulse width modulation signal and the fine gain pulse width modulation signal to attain steering angle data for delivering the steering angle data to other systems that use the steering angles in a vehicle control.

Another embodiment of the present disclosure provides a steering angle sensor for mounting on a vehicle comprising a main gear coupled to and rotated with a steering column; a first auxiliary gear and a second auxiliary gear meshed with the main gear, respectively; angular detection means mounted adjacent to the first and the second auxiliary gears respectively for generating electric signals in concert with rotations of the first and the second auxiliary gears; and a calculation/control module for calculating steering angles from the electric signals generated by the angular detection means, determining a duty ratio corresponding to the steering angle and generating a rough gain pulse width modulation signal and a fine gain pulse width modulation signal.

The disclosed sensor is characterized by a duty ratio of the rough gain pulse width modulation signal that is determined depending on and linearly to the steering angle.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
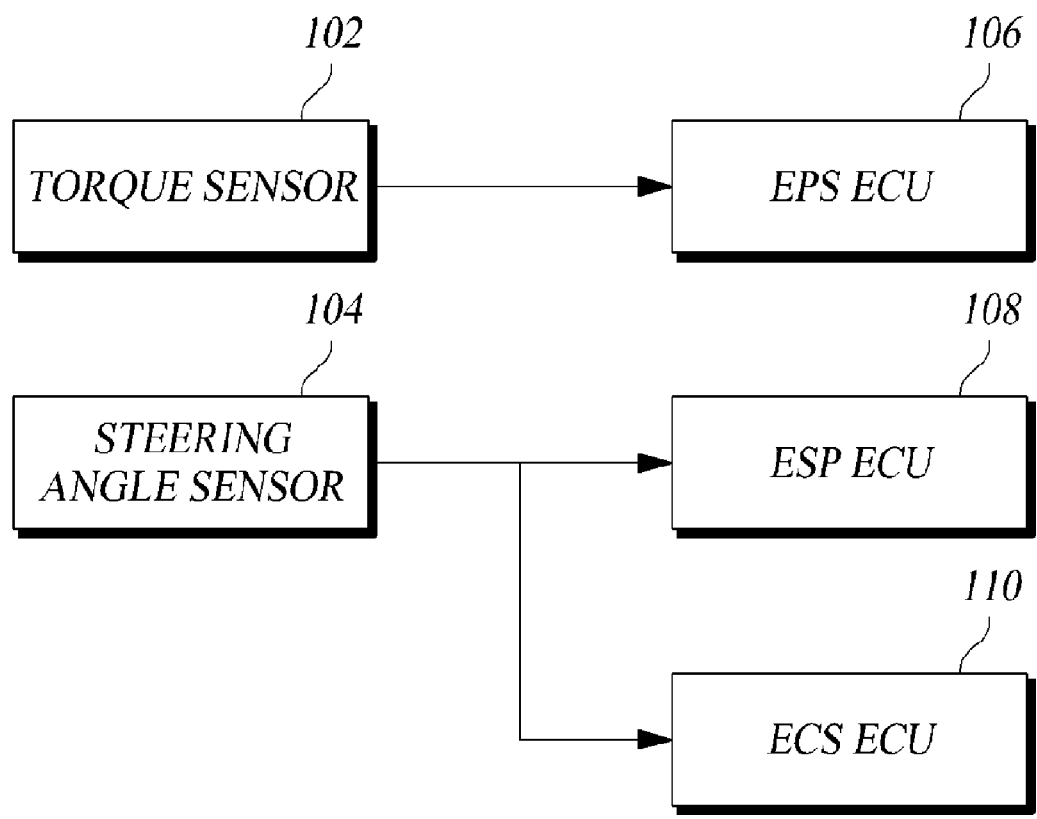
FIG. 1 is a schematic block diagram of a vehicle system equipped with conventional EPS, ESP and ECS.
Figure 2:
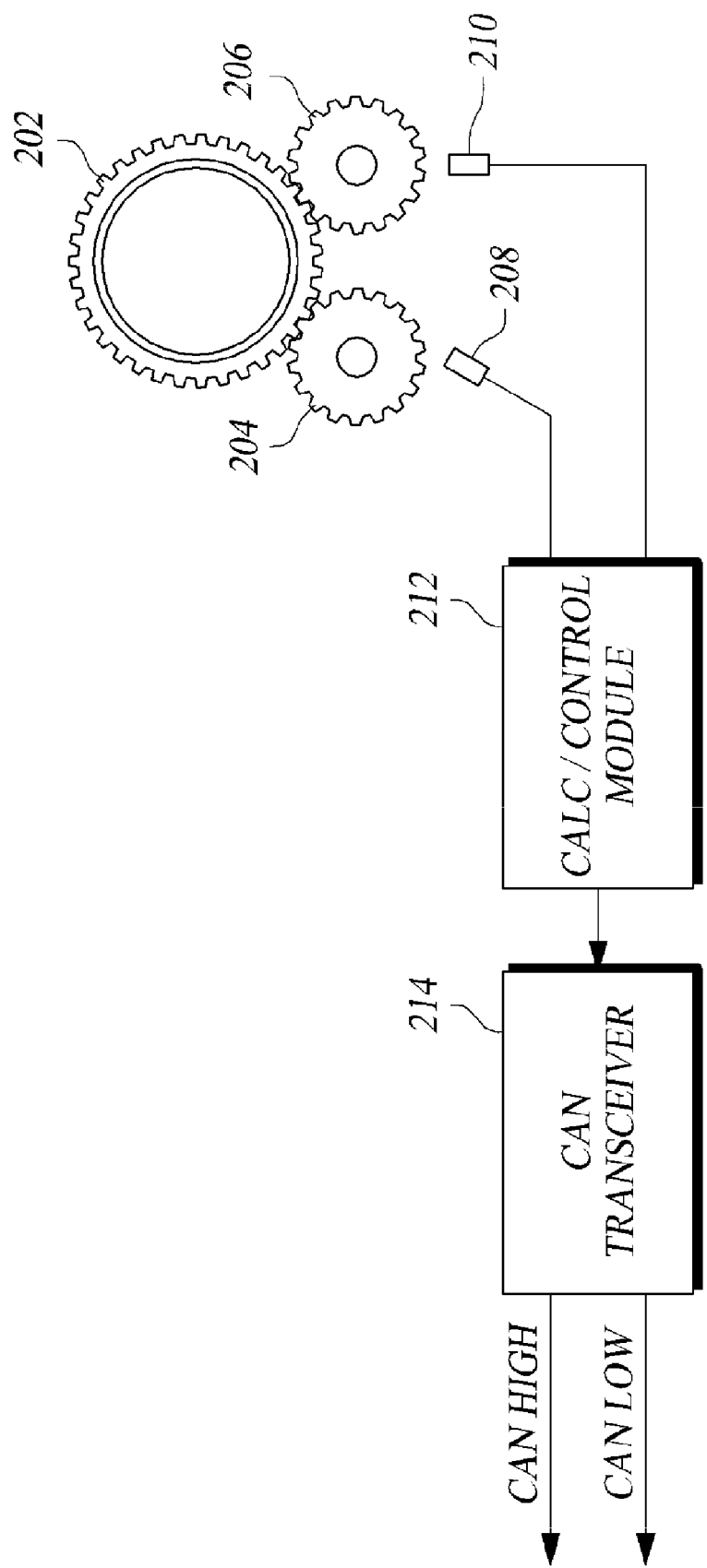
FIG. 2 is a diagram of a construction of a conventional steering angle sensor.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Figure 3:
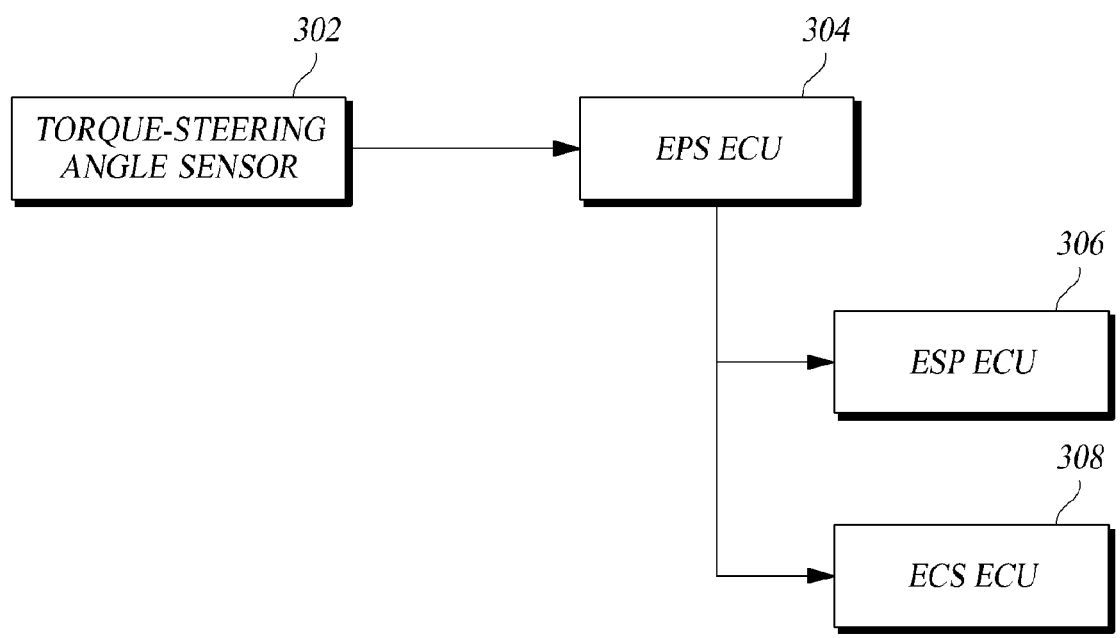
FIG. 3 is a schematic block diagram of a vehicle system according to an embodiment of the present disclosure.

FIG. 3 is a schematic block diagram of a vehicle system according to an embodiment of the present disclosure.

The vehicle system according to the present disclosure comprises a torque-steering angle sensor 302, an EPS ECU 304, an ESP ECU 306 and an ECS ECU 308. Torque-steering angle sensor 302 detects the torque and steering angle of a steering column induced from an operation of the steering wheel and delivers the detected torque and steering angle to EPS ECU 304. In the process, the torque-steering angle sensor 302 delivers the detected torque and steering angle in two channels of pulse width modulation or PWM signals, which are classified into rough gain PWM signals representing 0-1620° of steering angle data (steering angle data with respect to an absolute angle) delivered and fine gain PWM signals representing 0-90° of steering angle data (steering angle data with respect to a relative angle) delivered. The rough gain PWM signals and fine gain PWM signals will be discussed with reference to FIGS. 5 and 6.

EPS ECU 304 uses the received torque and steering angle data to perform the control to provide the steering assist and deliver the steering angle data to ESP ECU 306 or ECS ECU 308. It is possible to employ the CAN communication in transmitting the steering angle data.

ESP ECU 306 and ECS ECU 308 may perform the respective stability and suspension controls using the delivered steering angle data. In the present embodiment, torque-steering angle sensor 302 is described as integrally modularized but the present disclosure is not so limited. Rather, it may comprise two separate modules carrying the torque sensor and steering angle sensor, respectively.

Figure 4:
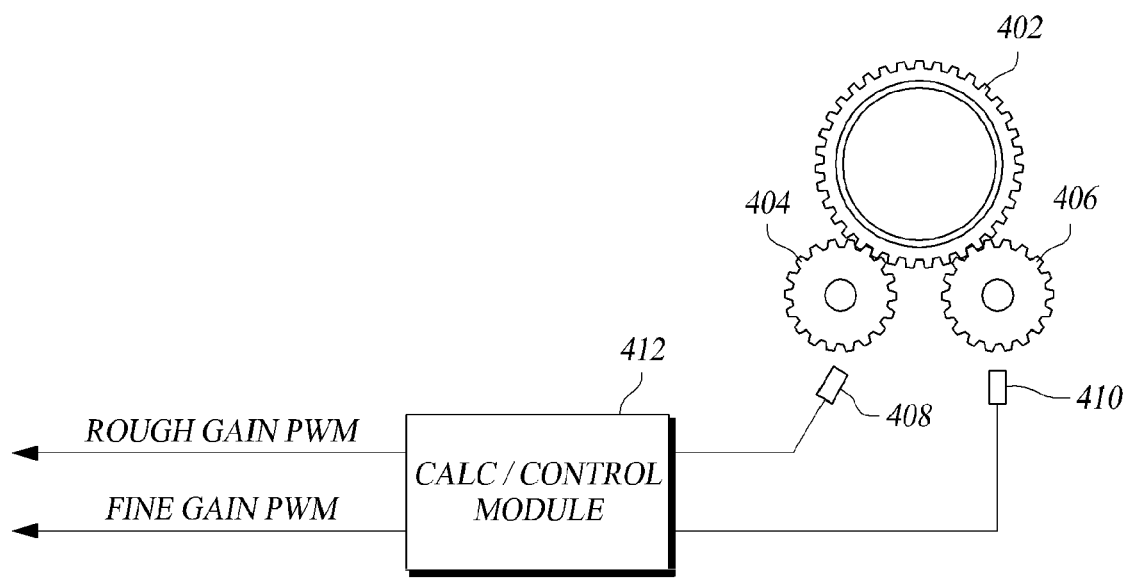
FIG. 4 is a diagram of a construction of a steering angle sensor according to an embodiment of the present disclosure.

FIG. 4 is a diagram of a construction of a steering angle sensor according to an embodiment of the present disclosure.

The steering angle sensor according to the present embodiment has a main gear 402, a first auxiliary gear 404, a second auxiliary gear 406, angular detective means 408 and 410, and a calculation/control module 412.

Integrally coupled to and rotatable together with the steering column is a main gear 402, to which first and second auxiliary gears 404, 406 are meshed. Positioned adjacent to these auxiliary gears 404 and 406, angular detective means 408 and 410 may repeatedly output electrical signals indicative of the rotational angles of the auxiliary gears 404, 406. For angular detective means 408 and 410, magneto resistance sensors and especially anisotropic magneto resistance sensors may be used. Alternatively, Hall ICs may be used.

In response to the driver's turning maneuver of the steering wheel, main gear 402 is rotated in accord with its driven first and second auxiliary gears 404, 406, thereby angular detective means 408, 410 interact with magnetic members (not shown) provided inside of first and second auxiliary gears 404, 406 to output electrical signals.

The calculation/control module 412 calculates the steering angle using the electric signals from angular detective means 408, 410. The method of calculating the steering angle of the steering wheel is in the realm of prior art and the description is omitted herein. In addition, calculation/control module 412 utilizes the forms of rough gain PWM signal and fine gain PWM signal in delivering the steering angle data to the vehicle systems requiring thereof.

Figure 5:
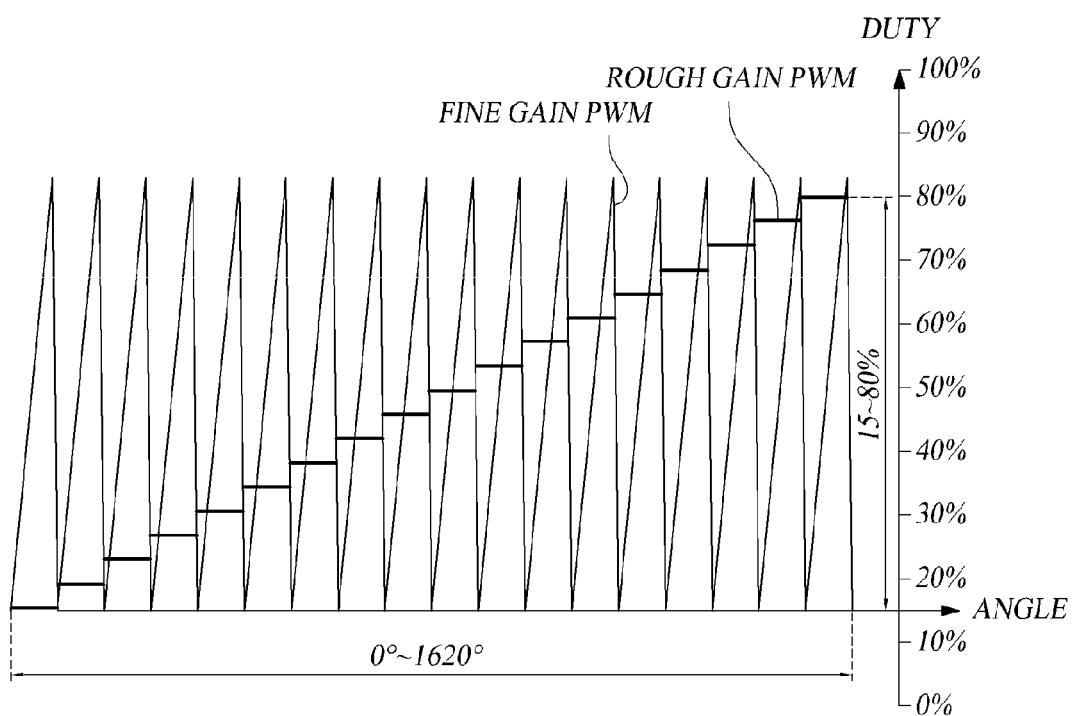
FIGS. 5 and 6 are graphs showing a rough gain PWM signal and a fine gain PWM signal applied to the present disclosure.
Figure 6:
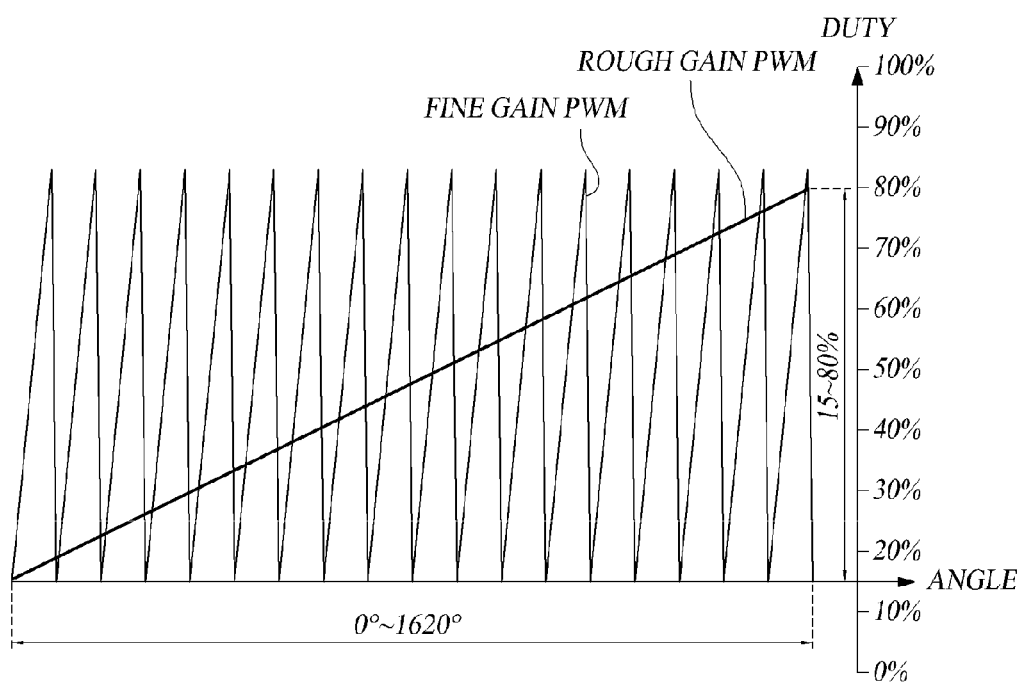

FIGS. 5 and 6 are to describe the rough gain PWM signals and fine gain PWM signals where FIG. 5 illustrates the relationship between the steering column angles and duty ratios of the PWM signals.

The steering wheel may have 4.5 revolutions (1620°) to make the wheel turn from lock to lock (from far left to far right), and herein the rough gain PWM signal provides its related information, i.e. low resolution information on 0-1620° of steering angle. In the FIG. 5 embodiment, the steering angle 1620° is divided by unit of 90° into eighteen divisions respectively having their duty ratios determined. For example, for the steering angle in the range of 0-90° which is division 1, the duty ratio is set as 15%, and for the steering angle in the range of 90-180° which is division 2 the duty ratio is set as 19%. Therefore, upon calculation of the steering angle in the calculation/control module the corresponding duty ratio to the steering angle may be determined and transmitted in the form of rough gain PWM signal. In other word, it is possible to transmit the general steering angle information through the PWM signal to the ECU.

On the other hand, the fine gain PWM signal may be employed in providing high definition information on 0-90° of steering angle. Considering the limitation of the rough gain PWM signal that only provides low-resolution steering wheel angle less than precise steering angle data, the fine gain PWM signal is adapted to provide the necessary precision of the steering angle off the divisional steering angle value calculated from the rough gain PWM signal.

In the FIG. 5 embodiment, steering angle may be divided to the extent that 0-90° range of steering angle is broken by unit of 0.1° into 909 divisions. Thus, duty ratios determined at every 0.1° will provide more precise high precision steering angles. For example, in a case where the rough gain PWM signal duty ratio is 15% and the fine gain PWM signal duty ratio is 15%, it can be known from this rough gain duty ratio that its steering angle is somewhere in the range of 0-90° and precisely 0-0.1° from the fine gain duty ratio, thereby indicating the transmitted steering angle as zero. If the rough gain PWM signal duty ratio were 19% with the fine gain PWM signal duty ratio being 15%, the condition means the steering angle is in between 90° and 180° and thus it is 90°.

As such, without needing to use a CAN communication the rough and fine gain PWM signals may deliver the steering angles to various vehicle control systems.

Further, steering angle 1620° may be subdivided so that the rough gain PWM signal duty ratio is linearly dependant upon the steering angles in order to reduce any errors induced from the PWM signal form of delivery of the steering signals. For example, if the fine gain PWM signal duty ratio were 15% and the rough gain PWM signal had a hysteresis or chattering near 90°, then the rough gain PWM signal duty ratio will be determined in division 1 or division 2, i.e. at 15% or 19%. Therefore, the steering angle becomes either 0° or 90° resulting in 90° of error.

FIG. 6 is to describe a method to reduce such an error illustrating a map where the rough gain PWM signal duty ratio is adapted to follow the steering angle linearly.

FIG. 6 embodiment divides the steering angle by unit of 0.8° into 900 divisions where the rough gain PWM signal duty ratio is determined by unit of 1.8°, thereby holding any errors to the minimum even if a hysteresis or chattering occurs.

As described above, according to this embodiment of the present disclosure, the steering angle data generated by the steering angle sensor can be delivered to the various vehicle systems without having to use the extra CAN communication saving that amount of the manufacturing cost.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. A vehicle system comprising:
    a torque-steering angle sensor structured in one sensor unit or two individual sensor pairs for detecting torques and steering angles by a driver's steering operation, determining a duty ratio corresponding to the steering angle and generating a rough gain pulse width modulation signal and a fine gain pulse width modulation signal; and
    an electronic control unit of an electric power steering system for receiving the rough gain pulse width modulation signal and the fine gain pulse width modulation signal to attain steering angle data for delivering the steering angle data to other systems that use the steering angles in a vehicle control.

2. The vehicle system in claim 1, wherein the duty ratio of the rough gain pulse width modulation signal is determined depending on and linearly to the steering angle.

3. The vehicle system in claim 1, wherein the other systems include at least an electronic stability program and an electronically controlled suspension.

4. The vehicle system in claim 1, wherein the electronic control unit transmits the steering angle data via a controller area network to the other systems.

5. A steering angle sensor for mounting on a vehicle comprising:
    a main gear coupled to and rotated with a steering column;
    a first auxiliary gear and a second auxiliary gear meshed with the main gear, respectively;
    angular detection means mounted adjacent to the first and the second auxiliary gears respectively for generating electric signals in concert with rotations of the first and the second auxiliary gears; and
    a calculation/control module for calculating steering angles from the electric signals generated by the angular detection means, determining a duty ratio corresponding to the steering angle and generating a rough gain pulse width modulation signal and a fine gain pulse width modulation signal.

6. The steering angle sensor in claim 5, wherein the duty ratio of the rough gain pulse width modulation signal is determined depending on and linearly to the steering angle.

* * * * *